US008751489B2

(12) United States Patent
Ortega et al.

(10) Patent No.: US 8,751,489 B2
(45) Date of Patent: Jun. 10, 2014

(54) PREDICTIVE SELECTION OF ITEM ATTRIBUTES LIKELY TO BE USEFUL IN REFINING A SEARCH

(75) Inventors: Ruben E. Ortega, Seattle, WA (US); David R. Bailey, Palo Alto, CA (US); Udi Manber, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 13/599,981

(22) Filed: Aug. 30, 2012

(65) Prior Publication Data

US 2012/0323953 A1 Dec. 20, 2012

Related U.S. Application Data (63) Continuation of application No. 11/187,630, filed on Jul. 22, 2005, now Pat. No. 8,260,771.

(51) Int. Cl.
*G06F 7/00* (2006.01)
(52) U.S. Cl.
USPC .......................................................... 707/723

(58) Field of Classification Search
USPC ........................................................ 707/723
See application file for complete search history.

(56) References Cited

U.S. PATENT DOCUMENTS

| 6,643,640 | B1 * | 11/2003 | Getchius et al. | 707/719 |
| 2003/0061225 | A1 * | 3/2003 | Bowman et al. | 707/100 |
| 2005/0222987 | A1 * | 10/2005 | Vadon | 707/3 |

* cited by examiner

*Primary Examiner* — Truong Vo
(74) *Attorney, Agent, or Firm* — Knobbe, Martens, Olson & Bear, LLP (57) ABSTRACT

Systems and methods are described for identifying item attributes that are likely to be useful to users in refining searches for items. In one embodiment, when a user submits a search query to search for items, all or a portion of the search query is used to look-up a previously-generated list of item attributes (and optionally associated attribute values) that are associated with the search query and are useful for refining the search. These item attributes, and any associated attribute values, are then presented to the user in a selectable form such that the user can interactively narrow the search.

14 Claims, 5 Drawing Sheets

PREDICTIVE SELECTION OF ITEM ATTRIBUTES LIKELY TO BE USEFUL IN REFINING A SEARCH

CROSS-REFERENCE TO RELATED APPLICATION

This application is a continuation of and claims priority to U.S. patent application Ser. No. 11/187,630, entitled "Predictive Selection of Item Attributes Likely to Be Useful in Refining a Search" and filed Jul. 22, 2005, the entirety of which is incorporated herein by reference.

BACKGROUND

1. Field of the Invention

The present invention relates to search engine systems that provide functionality for interactively searching electronic databases of items. More particularly, the invention relates to computer-implemented methods for identifying item attributes that are likely to be important to a user who is performing a search for items.

2. Description of the Related Art

A number of search engine systems exist that provide functionality for users to search for items by specifying, or placing constraints on, values of particular item attributes. The attributes for which values may be specified or constrained are typically pre-specified by the designer of the search engine's user interface based on the types of items involved. For instance, a search interface for locating book titles may include separate search fields for "author," "title," "subject," and "ISBN number." Thus, for example, by entering the name "Krakauer" in the author field, the user can limit the search to book titles for which the value of the "author" attribute contains the name "Krakauer."

The ability to provide useful, attribute-specific search fields in the above example exists largely because the attributes that are important to users (author, title, subject, and ISBN number) apply to most or all of the items in the domain being searched. In applications involving more diverse sets of searchable items, and thus more diverse sets of item attributes, this characteristic commonly does not exist. In these applications, the task of providing functionality for searching by item attribute becomes considerably more difficult.

As one example, an online entity that hosts an electronic catalog of products spanning a diverse set of product categories (books, music, audio equipment, cameras, apparel, software, subscriptions, etc.) may wish to provide a general-purpose search interface through which a user can run a search that spans all of these product categories. Because a high degree of product diversity exists in this example, the product attributes that will be important to the searcher will tend to vary widely according to the category or type of item sought. For example, the attribute "megapixels" may be important to a person searching for digital cameras, while the attributes of "size" and "color" may be important to a person searching for apparel items. As a result, and in view of the large number of attributes involved, the designer of the general-purpose search interface will likely have to omit "search by attribute" functionality for many of the product attributes that are important to users.

SUMMARY

The present invention provides computer-implemented methods for identifying item attributes that are likely to be useful to users in refining searches for items. In one embodiment, when a user submits a search query to search for items represented in a data repository, all or a portion of the search query (e.g., the entire search string) is used to look up a previously-generated list of item attributes, and optionally associated attribute values. These item attributes and any associated attribute values are then presented to the user (typically on a search results page) in a selectable form such that the user can interactively narrow the search. The attributes, and any attribute values, that are presented in connection with a given search query are dependent upon the actions of prior users who have submitted the same search query.

For example, a user who searches for "leather shoes" may be presented with a link for narrowing the search to color=black, as well as links corresponding to other attribute-value pairs. The links that are presented in this example may be dependent upon actions performed by other users who have searched for "leather shoes." For instance, the link for limiting the search to the attribute-value pair color=black may be presented in response to an automated determination that a relatively large number of the users who have searched for "leather shoes" have selected a product (for viewing, purchasing, adding to a shopping cart, etc.) having a "color" attribute of black. The determination of whether to present this link may also take into consideration whether this particular attribute value (or the "color" attribute in general) is likely to be useful in distinguishing some search result items from others.

In one embodiment, the associations between particular search criteria and item attributes are determined, at least in part, by periodically analyzing a most recently collected set of user activity data. Thus, the associations change automatically to reflect the changes in preferences of users, and to reflect changes to the searchable repository of items. Rather than repeating or updating the analysis periodically, the analyses of user actions may be performed continuously, such as in real time.

One aspect of the invention is thus a computer-implemented method of assisting users in refining searches. The method comprises identifying search criteria (e.g., a search string) submitted by each of a plurality of users to search for items represented in a data repository, and programmatically identifying a plurality of items that are associated with the search criteria. The plurality of items are identified, at least in part, by analyzing item-specific actions performed by the plurality of users. The method further comprises programmatically analyzing attribute information of the identified plurality of items to select at least one item attribute that is useful for subdividing at least a portion of the plurality of items into multiple groups of items. At least partly in response to selecting the item attribute, an entry that associates the search criteria with the attribute is created in a computer memory. Subsequently, in response to a submission by a user of a search query that includes the search criteria, the attribute is looked up from the entry in the computer memory, and the user is provided an option to use the attribute to refine the search query.

Neither this summary nor the following detailed description purports to define the invention. The invention is defined by the claims.

BRIEF DESCRIPTION OF THE DRAWINGS

Specific embodiments of the invention are depicted in the drawings summarized below.

DETAILED DESCRIPTION OF SPECIFIC EMBODIMENTS

Particular embodiments of the invention will now be described with reference to the drawings. In these embodiments, the invention is used to assist web site users in refining their searches of an electronic catalog of products. As will be apparent, the invention may also be implemented in a variety of other contexts. For example, the invention may be used to assist users in locating other types of items, including but not limited to web sites, journal articles, news articles, files, people, blogs, television shows, auctions and businesses. In addition, the invention may be employed in other types of interactive systems, including but not limited to interactive television systems and online services networks.

I. Overview

Figure 1A:
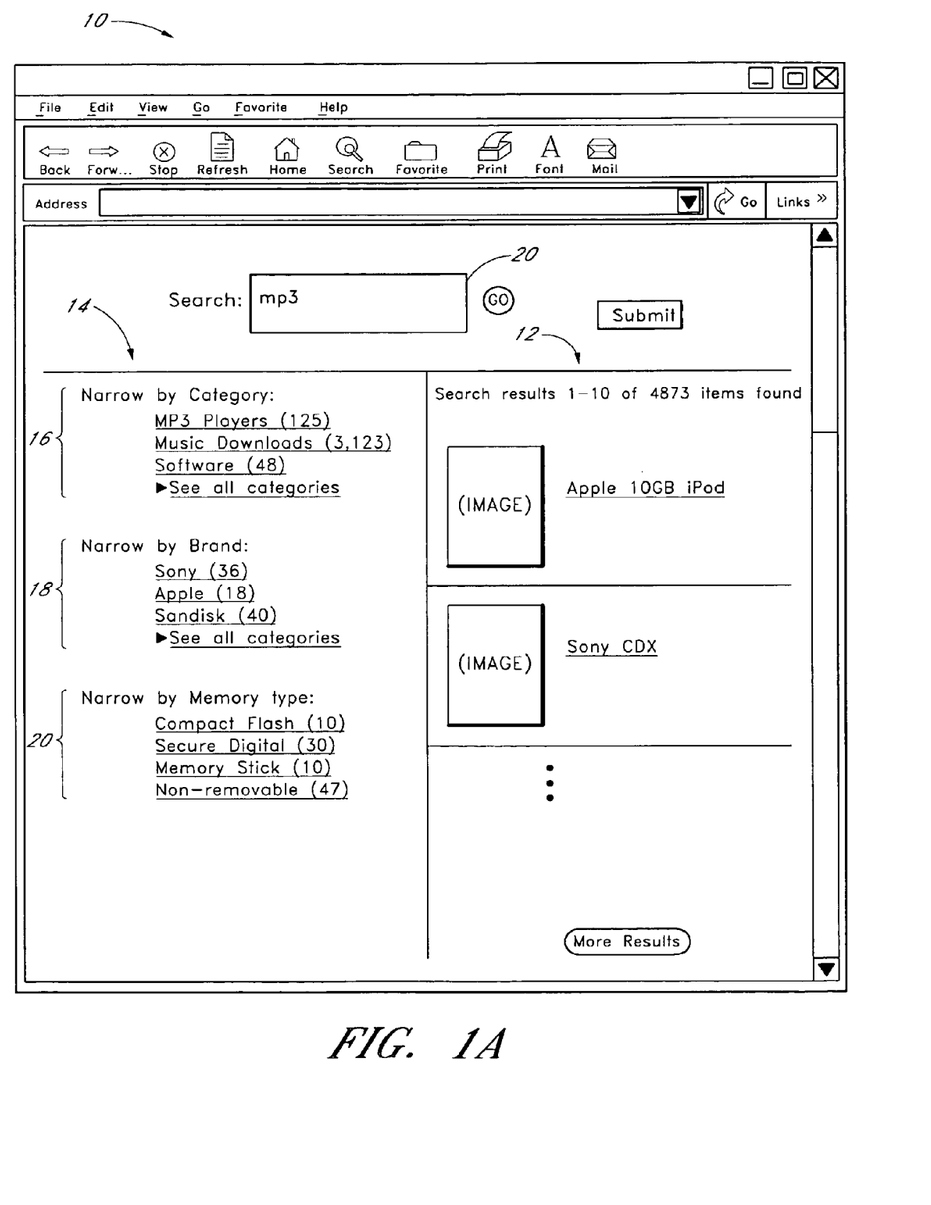
FIG. 1A illustrates one example of a search results page that may be generated in accordance with one embodiment of the invention.
Figure 1B:
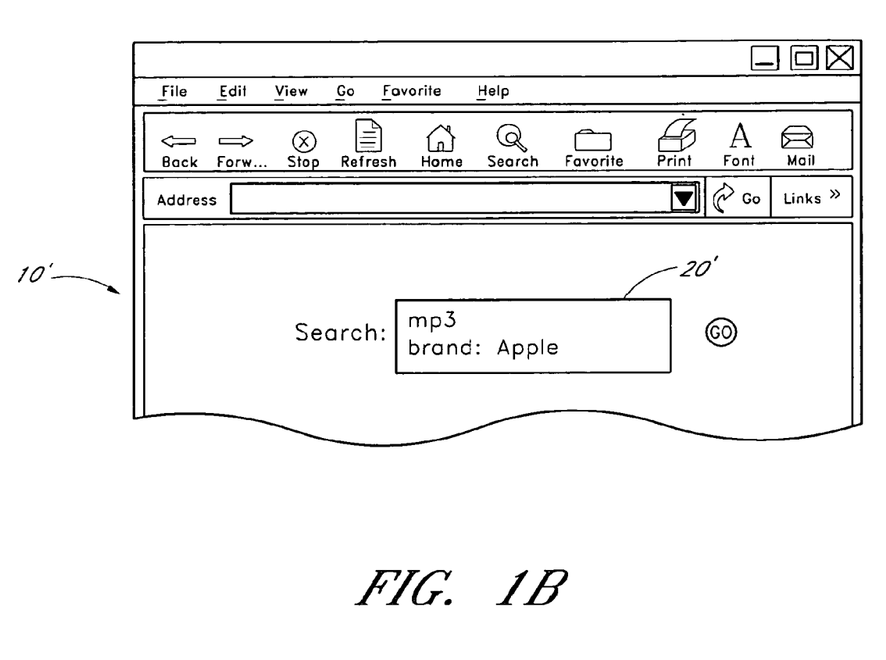
FIG. 1B illustrates how a user's search query, as displayed in a search box on a search results page, may be augmented automatically in response to the user's selection of one of the attribute-based search refinement links shown in FIG. 1A.

FIGS. 1A and 1B

Figure 2:
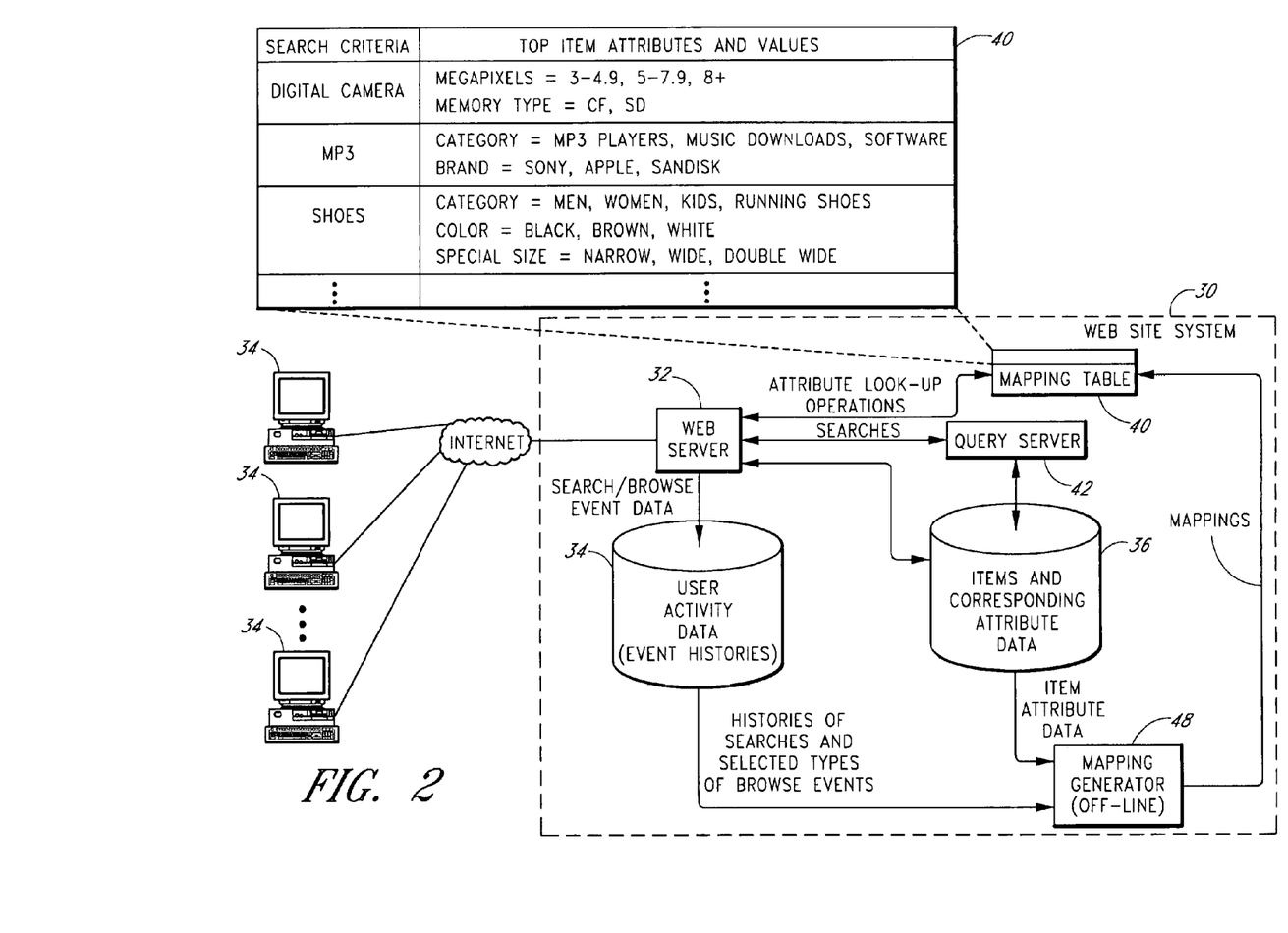
FIG. 2 illustrates a block diagram of a web-based system that embodies the invention.

FIG. 1A shows an example search results page 10 generated by a search engine system in accordance with one embodiment of the invention. The components of the search engine system are shown in FIG. 2, and are described separately below. In the example shown in FIG. 1A, a user has submitted the search query "mp3" from a search page (not shown) to search the electronic catalog. The search query in this example is not limited to any particular product category, and is not restricted to any particular attribute or field. Top ranked search results (matching items) 12 are listed on the right-hand side of the page, and are selectable by the user to access corresponding product detail pages of the electronic catalog. Additional search results can be viewed by selecting a "more results" button at the bottom of the page.

The search results page 10 also includes a search refinement section 14 that provides functionality for the user to narrow or refine the search using item or product attributes. In this particular example, the search refinement section 14 includes three sets of search refinement hyperlinks 16, 18, and 20, with each set corresponding to a particular item attribute. The "category" links 16 correspond to respective values of a "category" attribute, and are selectable by the user to narrow the search to corresponding product categories. The "brand" links 18 correspond to particular values of the "brand" attribute, and are selectable by the user to narrow the search to corresponding brands. The "memory type" links 20 correspond to an attribute called "memory type" that may be provided for some electronics products, and are selectable to limit the search to items having specific memory types.

Each search refinement link 16, 18, 20 in this example is displayed with a parenthetical number indicating the corresponding number of matching items. For example, the value "125" displayed as part of the "MP3 Players" link 16 indicates that one hundred and twenty five of the matching items fall within the "MP3 Players" category. The parenthetical values may alternatively be omitted.

The three particular attributes (category, brand, and memory type) included in the search refinement section 14 in this example are a small subset of the collection of item attributes that could potentially be used to refine the search. This is because the search results span many different product categories (electronics, music downloads, software, etc.), and because the attributes tend to vary widely across these product categories. For instance, some or all of the matching products in the "software" category may have an "operating system" attribute that indicates the type of operating systems these products run on, while products falling outside the "software" category likely will not include this attribute.

In accordance with the invention, the attributes that are presented in the search refinement section 14 of the search results page 10 are selected automatically based, at least in part, on actions performed by prior users who have submitted the same or a similar search query. For example, the links 20 for refining the search by "memory type" may be provided because a relatively large number of prior users who searched for "MP3" also viewed, purchased, and/or otherwise selected an item having a "memory type" attribute. The particular attribute values for which search refinement links 16, 18, 20 are displayed may also be dependent upon the actions of the prior searchers. For example, the link 20 for limiting the search to "Sony" products may be provided because a large number of the users who search for MP3 also selected a Sony product.

In one embodiment, this feature of the invention is implemented in part by collecting and programmatically analyzing user activity data reflective of search query submission events and one or more types of item-related actions. The item-related actions taken into consideration may include, for example, the selection of an item for viewing (such as when a user "clicks through" from a search results page to a particular item detail page); the addition of an item to an electronic shopping cart, wish list or rental queue; and/or the purchase, rental, or download of an item.

The analysis of user activity data may also optionally take into consideration collected data regarding the frequencies with which particular search refinement links, such as those shown as 16, 18 and 20 in FIG. 1A, are selected by users. For instance, if users who search for "MP3" rarely select any of the links 18 for narrowing the search by brand, an inference may automatically be made that brand is not very important to users who submit this search query. As a result of this inference, the system may, at least temporarily, discontinue displaying such links 18 to users who submit this particular search query. Thus, a feedback loop may effectively be provided in which implicit relevance feedback (i.e., user responses to the presented search refinement links) is used to adaptively refine the selections of attributes presented to users.

In one embodiment, associations between search strings (search terms and/or phrases) and product attribute information are based primarily or exclusively on a most recently collected set of user activity data (e.g., data reflective of user actions over the preceding week or month). As a result, attributes and attribute values presented on search results pages strongly reflect the current preferences of a population of users, which may include many thousands or millions of different users. For instance, if a new MP3 player is released by the company iRiver, and a large number of the users who search for MP3 purchase an iRiver MP3 player shortly thereafter, a strong association may develop between the search string "MP3" and the brand attribute "iRiver." As a result of this association, a search refinement link 16 for the brand "iRiver" may begin to be displayed on search results pages for "MP3." As another example, if "MP3" becomes a popular search string for locating downloadable MP3 files, search refinement links for product attributes such as "music genre," "artist" and "sampling rate" may begin to appear on search results pages for MP3.

In the particular example shown in FIG. 1A, the three product attributes listed in the search refinement section are non-numeric attributes. Where numeric attributes such as "price" or "megapixels" are selected for display (as is possible in one embodiment of the invention), each associated search refinement link may correspond to a particular range of attribute values. For example, separate links may be provided for each of the following constraints: megapixels=4 to 4.9, megapixels=5 to 5.9, megapixels=6 and above.

As illustrated in FIG. 1A, the search results page 10 in the illustrated embodiment includes a search box 20 which displays the search query submitted by the user. If desired, the user can edit the search query via the search box 20, and then select the "go" button to submit the modified search query. In addition or as an alternative to manually editing the search query, the user can select one of the search refinement links 16, 18, 20, as described above. When a user selects one of the search refinement links 16, 18, 20, the user's web browser formulates a refined search query by combining (e.g., logically ANDing) the query currently represented in the search box 20 with the attribute constraint represented by the search refinement link, and by submitting this refined search query to the search engine system. The search engine system then returns a new search results page corresponding to the refined search query.

In one embodiment, which is depicted in FIG. 1B, this new search results page 10' includes another search box 20' which displays, and allows the user to edit, the refined search query. In the particular example shown in FIG. 1B, the user has selected the "Apple" link 18 shown in FIG. 1A, causing the attribute constraint "brand: apple" to be added to the search query. Although not depicted in FIG. 1B, this new search results page 10' may include a different set of search refinement links from those of FIG. 1A, with the new search refinement links being dependent upon actions performed by prior users who have searched for MP3 AND BRAND: APPLE. Rather than displaying the refined search query as in FIG. 1B, a message may be displayed identifying the constraint that has been applied to the search query (e.g., "only those search result items for which brand=apple are currently shown").

As will be apparent, the search refinement interface 14 shown in FIG. 1A may be modified in a number of ways. For example, the search refinement links 16, 18, 20 may be replaced with checkboxes, such that the user can add multiple attribute-based constraints (e.g., category=MP3 players and brand=Sandisk) before resubmitting the search query. Further, rather than displaying specific attribute values, the search refinement section 14 may merely include a single link for each of the selected attributes. For instance, for the "brand" attribute, the search refinement section 14 may include a single link labeled "narrow by brand," which may be selectable to access a separate page listing the specific brands that can be selected.

II. System Components

FIG. 2

FIG. 2 illustrates one example of how a search engine as described above may be implemented in the context of a web site system 30 that provides access to an electronic catalog of items, such as products. A web site is one type of system in which the invention may be used; the invention may also be implemented in other types of systems that provide functionality for interactively searching a repository of items that have attributes.

As shown in FIG. 2, a web server 32 generates and serves pages of a host web site to end user computing devices 34. The web server 32 may be implemented as a single physical server or a collection of physical servers. The web server 32 provides user access to an electronic data repository 36, such as a database or a set of databases, containing information about the various items represented in the electronic catalog. The data repository 36 contains attribute data, including attribute names and values, for some or all of the items represented in the data repository. The number of attributes for each item is variable, and different items may have different attributes.

The items included or represented in the data repository 36 may, for example, include physical products that can be purchased or rented, digital products (journal articles, news articles, music files, podcasts, video files, software products, etc.) that can be purchased and/or downloaded by users, web sites represented in an index or directory, subscriptions, services, auction listings, and other types of items that can be stored or represented in a database. Many millions of different items and many hundreds or thousands of different item attributes may be represented in the item data repository 36. In one embodiment, the web server 32 accesses the data repository 36 by making calls to one or more associated services (not shown in FIG. 2).

As depicted by the query server 42, the web site system 30 also includes a search engine that allows users to search the item data repository 36 by entering and submitting search queries. To formulate a search query, a user types or otherwise enters a search string, which may include one or more search terms or keywords. The search string may be entered into a general search box or field that does not correspond to any particular item category, such that the search string is applied (effectively compared to) to all items in the electronic catalog. The web site's search interface may also optionally provide an option for the user to limit the search to a particular top-level browse category (e.g., "Books," "Electronics," "Auctions," etc.). In addition, the search interface may optionally support the ability for users to conduct field-restricted searches in which one or more search strings are entered into search boxes associated with specific database fields or attributes, such as author, artist, actor, subject, title, abstract, reviews, etc.

When a user submits a search query, the web server 32 passes the search query to the query server 42, which may be implemented as one or more physical servers. The query server 42 responds to the search query by generating and returning a list of the items that are responsive to the search query. As is conventional, the query server 42 may use a keyword index (not shown) to search the item data repository 36 for responsive items.

In addition to obtaining the list of responsive items from the query server 42, the web server 32 accesses a pre-generated mapping table 40 that maps specific sets of search criteria, such as specific search strings (terms and/or phrases), to the item attributes and associated values that are relevant to the search query, or are most likely to be helpful to the searcher in refining the search. (As mentioned above, the attribute values may alternatively be omitted.) If a matching entry is found, the web server 32 displays some or all of the relevant attributes and values on the search results page 10, as shown in FIG. 1A, together with responsive items. The mapping table 40 may be stored in the memory of each web server machine, or may be stored in the memory of one or more separate physical servers accessed by the web server machines. The memory or memories used to store the mapping table 40 may consist of solid state memories, or may include magnetic disk storage, optical storage, and/or other types of memory devices.

In one embodiment, when a user selects an item (product) on a search results page 10, the web server 32 returns an item detail page (not shown) for the selected item. Users can also navigate to particular item detail pages via a browse tree in which the items are arranged in a hierarchy of item categories. The item detail page includes detailed information about the item, such as a picture and description of the item, a price, and/or user reviews of the item. The item detail page may also include links for performing such selection actions as adding the item to a personal shopping cart or wish list, purchasing the item, renting the item, downloading the item, and/or submitting a rating or review of the item.

As illustrated in FIG. 2, each entry or row of the mapping table 40 associates particular search criteria, such as a particular search string (string of characters), with a list of attributes and corresponding attribute values. (Note that the term "search criteria," as used herein, includes a single search term.) For instance, the entry for the search string "digital camera" indicates that the attributes "megapixels" and "memory type" are associated with this search string. The table entry also includes associated numerical ranges of the "megapixels" attribute, and includes associated values for the "memory type" attribute. A large number (e.g., 5000 to 100,000) of entries may be included in the table 40, with each corresponding to a different respective search string that is commonly submitted by users.

Although depicted as a single table for purposes of illustration, the mapping table 40 may be implemented using multiple distinct tables and/or other types of data structures. For example, in one embodiment, two separate tables are used—a first table that maps search strings to particular item attributes, and another that maps search string/item attribute pairs to corresponding attribute values. Thus, for example, if a user submits the search string "leather jacket," the first table may initially be accessed to look up the attributes most closely associated with this search string; for each such attribute, the second table may then be accessed to look up the attribute values most closely associated with this search string. In general, the mappings of specific sets of search criteria to specific to attribute information may be embodied in computer storage using any appropriate type or types of data structure.

Figure 3:
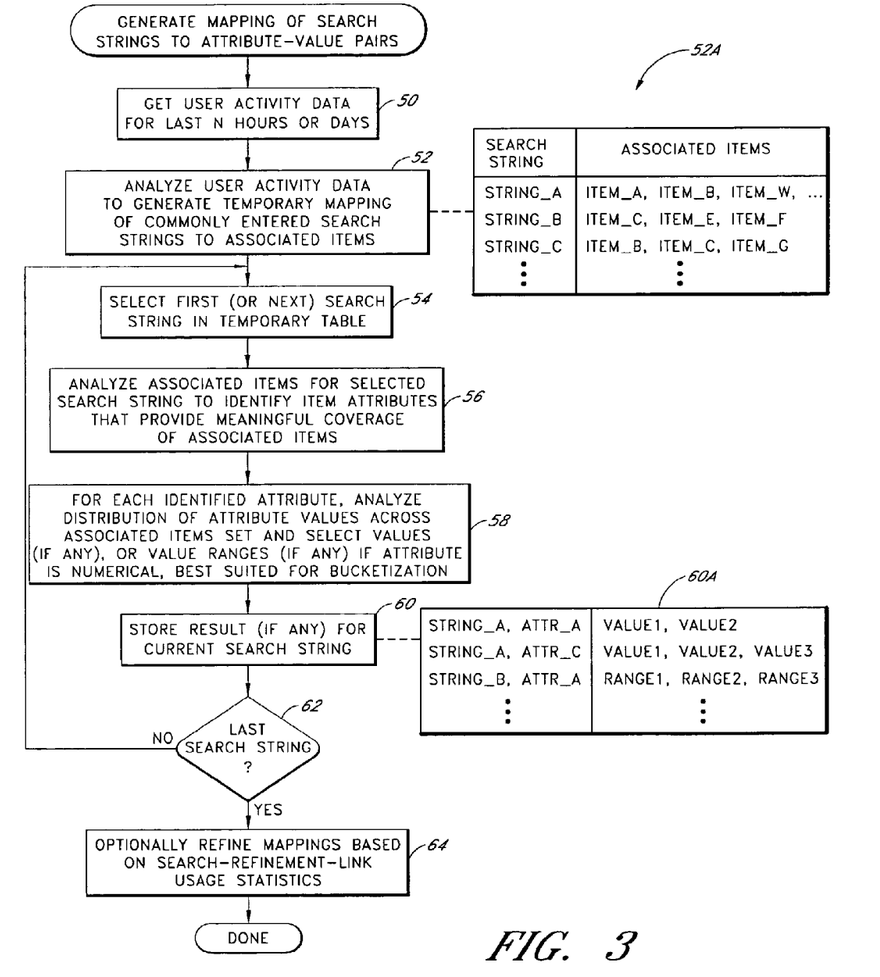
FIG. 3 illustrates a process implemented by the mapping generator component of FIG. 2 to generate a mapping of search strings, or other sets of search criteria, to particular item attributes and attribute values.

The mapping table 40 is generated by a mapping generator 48 that analyzes user activity data stored in a user activity database 34. As described in detail below, the mapping generator 48 automatically identifies associations between particular sets of search criteria and particular item attributes by collectively analyzing user activity data reflective of actions of users of the web site. For instance, if a large percentage of the users who submit the search query "powershot" also view, purchase, or otherwise show interest in items having a "megapixels" attribute, the mapping generator 48 may create a mapping table entry associating the search string "powershot" with the item attribute "megapixels." One example of a process that may be used to generate the mappings recorded in the mapping table is depicted in FIG. 3, which is described below.

The item-related actions that are taken into consideration in connection with a particular search query submission event may be appropriately limited and/or weighted to reflect the degree to which the action is likely associated with the search query submission. For example, in one embodiment, only those actions that are performed within a selected time interval of the search query submission are taken into consideration. In another embodiment, a decay algorithm is used to weight the item selection events; with this algorithm, an item selection action performed immediately after the search query submission is given the greatest weight, and each subsequent item selection action performed during the same session is given successively less weight.

The use of an automated computer process to detect the search criteria/item attribute associations provides a number of benefits. One such benefit is that mappings for many thousands of different sets of search criteria can be generated with very little or no human intervention. For example, mappings may be generated for the most commonly entered search strings. Another benefit is that the mappings tend to be very accurate, as they reflect the actual browsing patterns of a large number of users. An additional benefit is that the mappings can evolve automatically over time as items and item attributes are added to and/or deleted from the data repository 36, and as search and browsing patterns of users change.

In the illustrated embodiment, the user activity or "event" data stored in the user activity database 34 is based on events reported by the web server 32. The events included within the event histories may include search query submissions, item-related actions (item viewing events, item purchases, shopping cart adds, item rental events, etc.), and search query refinements made by clicking on search refinement links 16, 18 20 on search response pages 10. The event data recorded for each search query submission event may, for example, include the search string (search term or phrase) submitted by the user, an ID of the user or user session, an event time stamp, and if applicable, an indication of the collection(s) or type(s) of items searched. The event data may also identify the specific database field or fields that were searched, such as title, author, or subject.

The event data recorded for an item-related action, may, for example, include the ID of the item on which the action was performed, an ID of the user or user session, an event time stamp, the type of action performed (e.g., item detail page view, shopping cart add, purchase, rental, etc.), and the type of page from which the action was performed (e.g., search results page, browse node page, etc.). The type or types of item-related actions that are recorded within the user activity database 34 and used to detect the associations may vary depending upon the nature of the web site (e.g., web search engine site, retail sales site, digital library, music download site, product reviews site, etc.). If multiple different types of item-related actions are recorded, the mapping generator 48 may optionally accord different weights to different types of such actions.

In addition to item-related events, other types of user actions, such as category selection events (as may occur when, for example, a user navigates a browse tree), may be recorded within the user activity database 34 and used to detect the associations. Further, "impression event" data may be stored regarding impressions of particular attribute-based search refinement links 16, 18, 20 on search results pages.

The event histories may be stored within the user activity database 34 in any of a variety of possible formats. For example, the web server 32 may simply maintain a chronological access log that describes some or all of the client requests it receives. A most recent set of entries in this access log may periodically be retrieved by the mapping generator 48 and parsed for analysis. Alternatively, the event data may be written to a database system that supports the ability to retrieve event data by user, event type, event date and time, and/or other criteria; one example of such a system is described in U.S. patent application Ser. No. 10/612,395, filed Jul. 2, 2003, the disclosure of which is hereby incorporated by reference. Further, different databases and data formats may be used to store information about different types of events (e.g., search query submissions versus item-related actions).

For purposes of analysis, the user activity data (event histories) stored in the database 34 may be divided into segments, each of which corresponds to a particular interval of time such as one day or one hour. The mapping generator 48 may analyze each such segment of activity data separately from the others. The results of these separate analyses may be combined to generate the mappings reflected in the mapping table 40, optionally discounting or disregarding the results of less recent segments of activity data. For example, correlation results files for the last two weeks of user activity data may be combined to generate a current set of mappings, and this set of mappings may be used until the next segment of user activity data is processed to generate new mappings. Each time the mapping generator 48 processes a new block of activity data, it either updates or regenerates the mapping table 40 to reflect the latest user activity.

Although the mapping table 40 maps search strings to item attributes in the illustrated embodiment, a table that maps more generalized sets of search criteria to item attributes, including search criteria that identifies the type of the search, may alternatively be used. For example, mapping table entries may be included that correspond to specific collections of items searched (e.g., products search, literature search, web search, etc.).

III. Generation of Mapping Table

FIG. 3

FIG. 3 illustrates one example of a process that may be used by the mapping generator 48 to generate the mapping table 40. This process may be executed periodically, such as once per hour, per day or per week, to update or regenerate the mapping table 40. As will be apparent, numerous variations and additions to this process are possible, a few of which are discussed below.

In block 50, the mapping generator 48 retrieves from the user activity database 34 the event data for search events and item-related actions for all users over the relevant time interval. The time interval may, for example, be the last hour, twenty four hours, or week. The activity data that is retrieved may be limited in scope to particular types of user actions. For instance, search query submissions that were limited in scope to a particular item category, and/or which were limited to a particular attribute field (author, title, etc.), may be omitted.

In block 52, the retrieved event data is used to generate a temporary table 52A that maps "commonly submitted" search strings to associated catalog items. As part of this process, search strings that are commonly submitted (e.g., have been submitted by a threshold number of users within the relevant time interval) are initially identified. Search strings for which the size of the search results set falls below some threshold (e.g., less than twenty items) may be excluded since users generally do not need to refine their searches when the search result set is small. A given search string may consist of a single search term or "keyword", or may be a search phrase that includes multiple search terms. The process may alternatively be limited to one of these types of search strings (i.e., search terms only or search phrases only). Search strings that are highly similar, such as those that are identical when capitalization, noise words ("a," "the," "an," etc.), singular versus plural forms of terms, and punctuation variations are ignored, may be treated as the same search string during this process. Typically, many tens or hundreds of thousands of commonly submitted search strings are identified and included in the table 52A.

Once the commonly submitted search strings are identified in block 52, the associated actions of the users who submitted each such search string are analyzed to identify the catalog items that are the most closely associated with the respective search string. As mentioned above, any one or more types of item-related actions may be taken into consideration during this process, including but not limited to selection of an item for viewing, the addition of an item to a shopping cart, wish list, or rental queue, the purchase or rental of an item, the downloading of an item, or the submission of a rating or a review of an item. The types of actions that are available for consideration will generally depend upon the nature and purpose of the particular web site. For example, if the particular web site does not provide functionality for purchasing or renting the items, item purchase and rental data will not be available for consideration. Different types of actions may be accorded different amounts of weight; for instance, an item purchase may be accorded more weight than an item viewing event.

The item-related actions that are taken into consideration in block 52 in connection with each search query submission event may be appropriately limited to those actions that are likely associated with the search query submission. This may be accomplished in any of a number of ways. For example, the analysis may be limited to one or more of the following (a) item-related actions that occurred during the same browsing session as the search query submission event, (b) item-related actions that occurred within some time period, such as one hour or one day, of the search query submission event, (c) actions performed with respect to items that were actually responsive to the search query submission. Further, as mentioned above, a decay algorithm may be used to give successively less weight to each item related action that occurs following the search query submission event.

Any of a variety of scoring algorithms may be used to measure the degrees of association between particular search strings and particular items, including but not limited to the scoring algorithms described in U.S. Pat. No. 6,185,558, the disclosure of which is hereby incorporated by reference. For purposes of generating the temporary table 52A, items that do not have a sufficiently strong association with a particular search string are not included in the list of "associated items" for that search string. The list of associated items recorded in the temporary table 52A may have a maximum length, such as one hundred or two hundred items, and may consist of those items having the strongest association with the search string. Items that are not responsive to a given search string may be excluded from the "associated items" list for that search string.

In addition to strength of association, the algorithms used to generate the associated items lists may optionally take into consideration information about the items themselves. As one example, an item may be accorded lesser weight (reducing its likelihood of appearing in any "associated items" lists) if it has been discontinued or is no longer in stock, and may be accorded a greater weight if, for example, it is currently overstocked.

Once the temporary table 52A has been generated, the mapping generator program 48 enters into a loop which includes blocks 54-62 of FIG. 2. In each iteration of this loop, the program selects one of the search strings represented in the temporary table 52A, and then attempts to identify item attributes, and associated attribute values, that are likely to be useful in refining a search query containing or consisting of this search string. If this task in successful, one or more entries are created in a second mapping table 60A, as described below in connection with block 60.

More specifically, in block 54, one of the search strings represented in the temporary table 52A is selected. In block 56, the catalog items included in the corresponding "associated items" list are analyzed to identify item attributes that provide meaningful coverage of this set of associated items. An attribute may be treated as providing meaningful coverage if, for example, more than some threshold percentage (e.g., 5% or 10%) of the items in the corresponding "associated items" list have that attribute. Thus, for example, if 20% of the items that are associated with the selected search string have a "megapixels" attribute, this attribute may be identified as providing meaningful coverage. Some common attributes may be disregarded during this step 54 even though they cover most or all of the associated items. For instance, although most or all of the associated items may have a "name" attribute, this attribute may be disregarded since it generally is not useful for dividing search results into bins or "buckets" of items.

In block 58, the values of the attributes identified in block 56 are analyzed to identify any values, or value ranges in the case of numerical attributes, that are suitable for grouping the associated items into multiple buckets or clusters of items. For example, suppose that eighty of the "associated items" for the current search string have a "brand" attribute, and that values of this attribute are distributed as follows: Sony: 25 items; Panasonic: 20 items; Toshiba: 15 items; all other brands: 1 item each. In this example, "Sony," "Panasonic" and "Toshiba" are each useful for grouping together items into buckets of a useful size, while the other brands likely are not. For purposes of this analysis, a minimum bucket size, such as 2, 3, 4, or 5 items, may be used.

In some cases, the analysis of an attribute will reveal that the attribute likely is not well suited for bucketization (clustering) of search result items in connection with the current search string. This may be the case where, for example, one of the following conditions exists: (1) most or all of the "associated items" have the same value for this attribute, or (2) most or all of the associated items have different values for this attribute. In the case of numerical attributes such as "price," "weight," "megapixels," the ranges of values for which buckets can be formed may be pre-specified, or may be identified using a clustering algorithm.

As depicted in block 60, if suitable attribute values (including ranges) are identified for the current search string in block 58, the results are stored in a table 60A. Specifically, if, for a particular attribute, two or more values (or ranges) were identified that are useful for bucketizing or clustering search results, a corresponding table entry is creating to map the search string and attribute to the corresponding attribute values. In the example table 60A shown, two entries exist for the search string STRING_A, one for attribute A (ATTR_A) and one for attribute C (ATTR_C). The first of these entries lists two values of attribute A that have been identified as useful for refining search queries involving STRING_A. The second entry lists three values of attribute C that have been identified as useful for refining search queries involving STRING_A.

The mappings represented in this table 60A generally correspond to those depicted in the table 40 shown in FIG. 2, and may ultimately be used to generate search refinement links 16, 18, 20 (FIG. 1A) to present on search results pages. Although not depicted in FIG. 3, each entry in the table 60A may optionally be stored in association with a corresponding score that represents a predicted degree of usefulness of the associated search refinement links. These scores may be used to select a display order in which to present a set of search refinement links on a search results page, and/or to select which search refinement links are to be displayed.

As depicted in block 64, once all of the search strings have been processed, the mappings represented in the table 60A may optionally be refined to reflect usage statistics associated with corresponding search refinement links. As one example, usage statistics may show that of those who searched for "leather shoes" and were then presented with an option to refine this search by color, only a very small number of users actually opted to refine the search by color. In view of this "relevance feedback" usage statistic (which may be based on activity occurring over a selected window of time, such as the preceding month), any table entries corresponding to this search string and the "color" attribute may be pruned from the table, or may have its ranking adjusted accordingly. As another example, if those who search for "leather shoes" very commonly opt to refine the search by brand, the table entries may be appropriately weighted or ordered to cause brand-based search refinement links to be displayed more prominently (e.g., at a higher position) on the search results page for this search string. As mentioned above, exposure and click through data for particular item attributes may be maintained in the user activity database 34 to permit the generation of such usage statistics.

Once the process shown in FIG. 3 is complete, the mappings represented in the table 60A may optionally be combined with mappings generated from earlier time windows. For example, mappings derived from the last day of user activity may be combined with mappings generated from each of the immediately preceding N days, with the amount of weight given to the older mappings decaying with time. The resulting mapping data may then be switched into use in place of the mappings in the current mapping table 40.

Although the process shown in FIG. 3 operates in an off-line mode, the mappings represented in the table 40 may alternatively be updated in real time in response to actions performed by users.

As will be apparent, the process shown in FIG. 3 may be modified to take into consideration additional types of associations between particular search strings (or more generalized sets of search criteria) and item attributes. For instance, the mappings may also reflect the results of a content-based analysis in which the search strings are compared to item records or descriptions in the data repository of items 36.

IV. Generation of Search Results Pages

Figure 4:
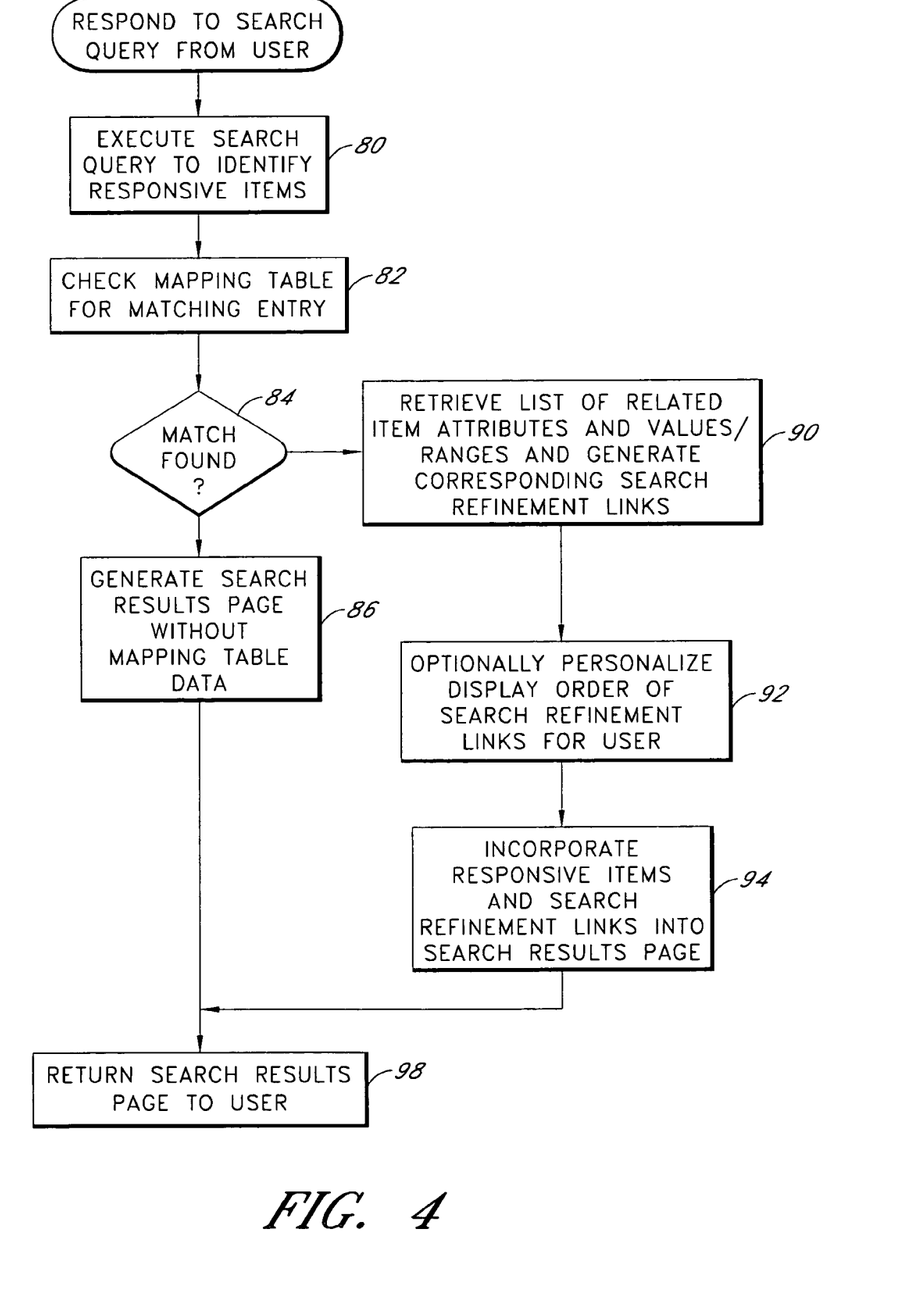
FIG. 4 illustrates a process implemented collectively by the web server and query server of FIG. 2 to generate search results pages of the type shown in FIG. 1A.

FIG. 4 illustrates one example of a sequence of steps that may be performed collectively by the web server 32 and query server 42 of FIG. 2 to process a search query from a user. The search query may be a non-category-specific search query (e.g., a search query directed to all product categories of a product catalog) submitted via a general search page or box. The search query may consist of a search string, or may, in some embodiments, include other types of constraints (e.g., field-based restrictions).

In block 80, the search query is executed to identify items from the item data repository 36 that are responsive to the search query. This step may be performed using a keyword index, as in known in the art.

In blocks 82 and 84, the web server 32 directly or indirectly accesses the mapping table 40 to determine whether a table entry exists that matches the user-supplied search criteria. The steps associated with these two blocks 82, 84 may be performed concurrently with the execution of the search query. In embodiments in which the mappings consist of search string to attribute mappings, this step is performed by determining whether a table entry exists that matches the user's search string. Minor variations between search strings, such as variations in the form of a search term (e.g., singular versus plural), may be disregarded for purposes of determining whether a match exists. If no match is found, the web server generates and returns a search results page that does not include attribute data read from the mapping table 40 (blocks 86 and 98). In this event, a set of related attributes may optionally be identified on-the-fly using an alternative method, such as a method that takes into consideration the attributes of the responsive items identified in block 80.

If a match is found in block 84, the associated list of item attributes and attribute values (including value ranges) is retrieved from the mapping table 40, and each attribute-value or attribute-range pair is translated into a corresponding search refinement link of the type shown in FIG. 1A. The table entry may also specify an order in which these search refinement links are to be presented on the search results page. As part of the process of generating the search refinement links, a determination may be made of how many items in the search result set match the corresponding attribute value or range; these numbers may then be incorporated into the link texts of the corresponding search refinement links, as shown in FIG. 1A.

As depicted in block 92, the display order of the search refinement links may optionally be personalized for the particular user conducting the search. For instance, if this particular user frequently refines searches by brand, then any search refinement links involving the "brand" attribute may be elevated to the upper-most display position. Finally, in blocks 94 and 98, the search refinement links are incorporated into the search results page along with a listing of the responsive items (as illustrated in FIG. 1A), and the search results page is transmitted to the user.

V. Embodiments in which Attribute Values are not Obtained from Mapping Table In another embodiment of the invention, the mapping table 40 only maps search criteria sets (e.g., search strings) to attributes, and not attribute values or value ranges. In this embodiment, the processing represented by block 58 in FIG. 3 is omitted, and similar processing is instead performed on-the-fly at search time. For example, if a user submits the search string "mp3," the search may be executed to generate a search result set (i.e., a set of responsive items), and the table 40 may be accessed to look up the attributes most closely associated with this search string. For each of such attribute, the attribute values found in the search result set may then be analyzed, using methods similar to those described above in connection with block 58, to evaluate whether these values are useful for subdividing clustering the search result set into groups or buckets that each include multiple items. The results of this on-the-fly analysis may then be used to display search refinement links on the search results page in the same manner as described above.

In yet another embodiment, the search results page provides an option to limit the search by particular attributes (as identified from the mapping table), but does not initially display any item attribute values or ranges. For example, the search results page may provide a link or control that says "narrow by brand," but which does not list any brands. If the user selects this link (or merely hovers the mouse cursor over the link in some embodiments), the web site system 30 may perform the on-the-fly processing needed to identify the corresponding attribute values or ranges for the current search results set, and then update or regenerate the search results page to include these values or ranges.

VI. Conclusion

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is defined only by the appended claims, which are intended to be interpreted without reference to any explicit or implicit definitions that may be set forth in the incorporated-by-reference materials.

What is claimed is:

1. A system for refining a search, the system comprising:
a data store configured to store a mapping table that associates each of a plurality of search strings with one or more item attributes; and
one or more computer systems in communication with the data store that are configured to:
receive a search string in association with a request to search for items represented in an electronic data store;
identify an entry in the mapping table corresponding to the received search string, wherein the entry in the mapping table associates the search string with one or more item attributes that have been determined to be useful for subdividing a plurality of items matching the search request into two or more groups of items; and
provide a selectable option to use a range of numeric attribute values for at least one of the one or more item attributes included in the mapping table entry to refine the search request, wherein the range of numeric attribute values is selectable from two or more ranges of numeric attribute values presented in association with the selectable option.

2. The system of claim 1, wherein the entry in the mapping table further associates the search string with one or more item attribute values.

3. The system of claim 1, wherein the one or more computer systems is further configured to present a plurality of selectable item attributes as options to refine the search request.

4. The system of claim 3, wherein the one or more computer systems is further configured to determine a display order for the plurality of selectable item attributes based at least in part on information associated with a user that submitted the request.

5. The system of claim 1, wherein the one or more item attributes included in the selectable option are determined based at least in part on usage statistics reflective of a frequency with which prior users have selected the one of more item attributes to refine a search request.

6. A computer-implemented method for refining a search, the computer-implemented method comprising:

as implemented by one or more computing devices configured with specific executable instructions, receiving a search request to search for items represented in an electronic data store, wherein the search request includes one or more search criteria;

identifying an entry corresponding to the received search criteria in a mapping table, wherein each entry in the mapping table associates search criteria with one or more item attributes that have been determined to be useful for subdividing a plurality of items matching the search criteria into multiple groups of items; and providing a selectable option to use a range of numeric attribute values for at least one of the one or more item attributes included in the mapping table entry to refine the search request, wherein the range of numeric attribute values is selectable from two or more ranges of numeric attribute values presented in association with the selectable option.

7. The computer-implemented method claim 6, further comprising:

receiving a selection of one or more item attribute values for the one or more item attributes; and providing information identifying a plurality of items associated with the search criteria that are further associated with the selected one or more item attribute values.

8. The computer-implemented method claim 6, wherein the one or more item attributes included in the selectable option are determined based in part on usage data regarding a frequency with which prior users have selected the one of more item attributes to refine a search request.

9. The computer-implemented method claim 6, wherein the one or more item attributes are associated with some, but not all, of the items matching the search request.

10. A non-transitory computer-readable medium storing computer executable instructions that, when executed by one or more computing devices, configure the one or more computing devices to perform operations comprising:

receiving a search string in association with a request to search for items represented in an electronic data store;

identifying an entry corresponding to the received search string in a mapping table, wherein the entry in the mapping table associates the search string with two or more ranges of numeric item attribute values that have been determined to be useful for subdividing a plurality of items matching the search request into two or more groups of items; and providing a selectable option to select at least one of the two or more ranges of numeric item attribute values included in the mapping table entry to refine the search request, wherein the two or more ranges of numeric item attribute values are presented in association with the selectable option.

11. The non-transitory computer-readable medium of claim 10, wherein the selectable option is presented in an interface that includes information identifying a plurality of items matching the search request.

12. The non-transitory computer-readable medium of claim 11, wherein the operations further comprise presenting an interface that includes information identifying items matching a refined search request based at least in part on one or more item attribute values selected to refine the search request.

13. The non-transitory computer-readable medium of claim 10, wherein the operations further comprise determining a display order for the two or more ranges of item attribute values in the provided selectable option based at least in part on information associated with a user that submitted the request.

14. The non-transitory computer-readable medium of claim 10, wherein the selected one of the two or more ranges of item attribute values is associated with some, but not all, of the items matching the search request.

\* \* \* \* \*